(12) United States Patent
Lee et al.

(10) Patent No.: US 9,073,209 B2
(45) Date of Patent: Jul. 7, 2015

(54) WALKING ROBOT AND CONTROL METHOD THEREOF

(71) Applicant: Samsung Electronics Co., Ltd., Suwon-si, Gyeonggi-do (KR)

(72) Inventors: Min Hyung Lee, Anyang-si (KR); Kyung Shik Roh, Seongnam-si (KR); Bok Man Lim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 86 days.

(21) Appl. No.: 13/770,357

(22) Filed: Feb. 19, 2013

(65) Prior Publication Data

US 2013/0218345 A1    Aug. 22, 2013

(30) Foreign Application Priority Data

Feb. 21, 2012    (KR) .................. 10-2012-0017424

(51) Int. Cl.
   *G05B 15/00*    (2006.01)
   *B25J 9/16*    (2006.01)
   *B62D 57/032*    (2006.01)

(52) U.S. Cl.
   CPC ............... *B25J 9/162* (2013.01); *B25J 9/1633* (2013.01); *B62D 57/032* (2013.01)

(58) Field of Classification Search
   CPC ................................ B25J 9/162; B25J 9/1633
   See application file for complete search history.

(56) References Cited

U.S. PATENT DOCUMENTS

| | | | |
|---|---|---|---|
| 5,151,859 A * | 9/1992 | Yoshino et al. ............ 701/23 |
| 5,255,753 A * | 10/1993 | Nishikawa et al. ........ 180/8.6 |
| 5,337,235 A * | 8/1994 | Takahashi et al. ......... 701/23 |
| 5,349,277 A * | 9/1994 | Takahashi et al. ........ 318/568.12 |
| 5,355,064 A * | 10/1994 | Yoshino et al. ........ 318/568.12 |
| 5,357,433 A * | 10/1994 | Takenaka et al. ......... 701/23 |
| 5,459,659 A * | 10/1995 | Takenaka ................ 700/260 |
| 5,594,644 A * | 1/1997 | Hasegawa et al. ........ 701/23 |
| 5,838,130 A * | 11/1998 | Ozawa .................. 318/568.2 |
| 5,974,366 A * | 10/1999 | Kawai et al. ............. 702/150 |
| 6,243,623 B1 * | 6/2001 | Takenaka et al. ......... 700/245 |
| 6,301,524 B1 * | 10/2001 | Takenaka ............... 700/245 |
| 6,493,606 B2 * | 12/2002 | Saijo et al. .............. 700/245 |
| 6,583,595 B1 * | 6/2003 | Hattori et al. ............ 318/567 |
| 6,917,175 B2 * | 7/2005 | Hattori et al. ............ 318/567 |
| 7,057,367 B2 * | 6/2006 | Furuta et al. ........... 318/568.12 |
| 7,266,424 B2 * | 9/2007 | Lee et al. ............... 700/245 |
| 7,278,501 B2 * | 10/2007 | Mori et al. .............. 180/8.5 |

(Continued)

FOREIGN PATENT DOCUMENTS

| | | |
|---|---|---|
| JP | 2008-49458 | 3/2008 |
| JP | 2008-119764 | 5/2008 |
| KR | 10-2011-0082711 | 7/2011 |

*Primary Examiner* — Bhavesh V Amin

(74) *Attorney, Agent, or Firm* — Harness, Dickey & Pierce, P.L.C.

(57) ABSTRACT

A walking robot capable of implementing a balancing action to ensure a stable walking on uneven ground based on an FSM-based walking control method, and a control method thereof, is capable of implementing stable walking by controlling torques of the hip joint, the knee joint and the ankle joint by use of FSM without calculating complicated Dynamics Equations. The walking robot ensures stable walking on uneven ground through a simple calculation by use of the angle formed by the ground and the both feet The walking robot is made to be applied to a robot provided with joints having six degrees of freedom through a simple calculation of compensation angles.

20 Claims, 10 Drawing Sheets

(56) References Cited

U.S. PATENT DOCUMENTS

| | | | |
|---|---|---|---|
| 7,319,917 B2* | 1/2008 | Takenaka et al. | 700/245 |
| 7,319,919 B2* | 1/2008 | Takenaka et al. | 700/245 |
| 7,643,903 B2* | 1/2010 | Kawai | 700/245 |
| 7,756,605 B2* | 7/2010 | Hirose et al. | 700/245 |
| 7,805,218 B2* | 9/2010 | Nagasaka | 700/245 |
| 8,287,477 B1* | 10/2012 | Herr et al. | 602/16 |
| 8,301,303 B2* | 10/2012 | Kwak et al. | 700/245 |
| 8,376,971 B1* | 2/2013 | Herr et al. | 601/5 |
| 8,423,183 B2* | 4/2013 | Kwak et al. | 700/245 |
| 8,498,742 B2* | 7/2013 | Kwak et al. | 700/245 |
| 8,512,415 B2* | 8/2013 | Herr et al. | 623/24 |
| 8,551,029 B1* | 10/2013 | Herr et al. | 602/16 |
| 8,612,054 B2* | 12/2013 | Kwon | 700/261 |
| 8,676,381 B2* | 3/2014 | Kwon et al. | 700/261 |
| 8,682,488 B2* | 3/2014 | Kwon | 700/253 |
| 8,688,273 B2* | 4/2014 | Lee et al. | 700/254 |
| 8,781,628 B2* | 7/2014 | Kwak et al. | 700/258 |
| 2003/0120388 A1* | 6/2003 | Kuroki et al. | 700/245 |
| 2005/0085948 A1* | 4/2005 | Herr et al. | 700/258 |
| 2005/0113973 A1* | 5/2005 | Endo et al. | 700/245 |
| 2010/0113980 A1* | 5/2010 | Herr et al. | 600/587 |
| 2010/0161115 A1* | 6/2010 | Kwak et al. | 700/245 |
| 2010/0161116 A1* | 6/2010 | Kwak et al. | 700/245 |
| 2010/0161117 A1* | 6/2010 | Kwak et al. | 700/245 |
| 2010/0161118 A1* | 6/2010 | Kwak et al. | 700/245 |
| 2010/0168917 A1* | 7/2010 | Roh | 700/258 |
| 2010/0185330 A1* | 7/2010 | Kwon | 700/261 |
| 2010/0324699 A1* | 12/2010 | Herr et al. | 623/27 |
| 2011/0172824 A1* | 7/2011 | Park et al. | 700/261 |

\* cited by examiner

WALKING ROBOT AND CONTROL METHOD THEREOF

CROSS-REFERENCE TO RELATED APPLICATIONS

This application claims the benefit of Korean Patent Application No. 2012-0017424, filed on Feb. 21, 2012 in the Korean Intellectual Property Office, the disclosure of which is incorporated herein by reference.

BACKGROUND

1. Field

One or more embodiments relate to a walking robot that enables the control of stable walking based on a finite state machine (FSM), and a control method thereof.

2. Description of the Related Art

In recent years, numerous studies have been actively conducted on a walking robot which has a similar joint system to that of a human and is designed to coexist with humans in human working and living spaces. Such walking robots include multi-leg walking robots having a plurality of legs, such as bipedal or tripedal walking robots, and in order to achieve stable walking of the robots, actuators, such as electric motors and hydraulic motors, located at respective joints of the robot need to be driven. Driving of the actuators is generally divided into a position-based Zero Moment Point (ZMP) control method in which command angles, i.e., command positions, of respective joints are given and the joints are controlled so as to trace the command angle, and a torque-based Finite State Machine (FSM) control method in which command torques of respective joints are given and the joints are controlled so as to trace the command torques.

In the ZMP control method, a walking direction, a walking stride, and a walking velocity of a robot are set in advance so as to satisfy a ZMP constraint, i.e., a condition that a ZMP is present in a safety region within a support polygon formed by (a) supporting leg(s), the safety region, if the robot is supported by one leg, representing a region of the leg, and if the robot is supported by two legs, representing a region set to have a small area within a convex polygon including a region of the two legs. In consideration of safety, walking patterns of the respective legs corresponding to the set factors are created, and walking trajectories of the respective legs are calculated based on the walking patterns. Further, angles of joints of the respective legs are calculated through inverse kinematic calculation of the calculated walking trajectories, and target control values of the respective joints are calculated based on current angles and target angles of the respective joints.

The ZMP control method is a position-based control method and thus achieves a precise position control, but performs precise angle control of the respective joints in order to control the ZMP and thus requires a high servo gain. Thereby, the ZMP control method requires high current and thus has low energy efficiency and high stiffness of the joints. In addition, the ZMP control method, in order to calculate the angles of the respective joints through an inverse kinematic from the center of gravity (COG) and the walking pattern of foot, needs to avoid the kinematic singularities, thereby causing the robot to have unnatural gait with the knees bent different from that of a human.

A torque-based dynamic walking control method is achieved through a servo control such that the respective legs trace calculated walking trajectories at each control time. That is, during walking, whether or not positions of the respective legs precisely trace the walking trajectories according to the walking patterns is detected, and if one or more legs deviate from the walking trajectories, the torques of motors are adjusted so that the respective legs precisely trace the walking trajectories.

In order to achieve a stable walking according to the torque-based dynamic walking control method, dynamic equations need to be solved, but the dynamic equations of a robot provided with legs having six degrees of freedom capable of implementing in a random direction in a space are significantly complicated. Accordingly, the torque-based dynamic walking control method is applied only to a robot provided with legs having four degrees of freedom or below.

On the other hand, in a Finite State Machine (FSM) control method, instead of tracing the position at each control time, operating states of a robot is defined in advance, target torques of respective joints are calculated by referring to the respective operating states during walking, and the joints are controlled so as to trace the target torques. Such an FSM control method controls torques of the respective joints during walking and thus enables a low servo gain, so that the high energy efficiency and low stiffness are possible, thereby ensuring safety with respect to the surrounding environment. Further, the FSM control method does not need to avoid kinematic singularities, thereby allowing the robot to have a more natural gait with knees extended straight similar to that of a human.

However, the FSM control method, which controls the walking of the robot depending on the operating state that is defined in advance, is not proper to the control of walking and thus the robot may lose the balance. Accordingly, there is a need for a balancing action that may keep the balance of the robot regardless of the walking motion.

SUMMARY

Therefore, it is an aspect of one or more embodiments to provide a walking robot capable of implementing a balancing action enabling a stable walking on an uneven terrain according to an FSM based walking control method, and a control method thereof.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

In accordance with one or more embodiments, a walking robot provided with a plurality of legs and two feet provided at each of the plurality of legs may include a joint, a ground angle calculator, a compensation value calculator, a target trajectory generator, a target torque calculator and a servo controller. The joint may be provided at each of the plurality of legs. The ground angle calculator may be configured to calculate a ground angle formed by a ground and the two feet. The compensation value calculator may be configured to calculate a compensation value of the joint by use of the calculated ground angle. The target trajectory generator may be configured to generate a target trajectory of the joint by use of the calculated compensation value. The target torque calculator may be configured to calculate a target torque of the joint so as to trace the generated target trajectory. The servo controller may be configured to control a walking of the robot by transmitting the calculated target torque to the joint.

The joint may include a hip joint, a knee joint and an ankle joint provided at each of the plurality of legs.

The walking robot may further include a force/torque (F/T) sensor. The force/torque (F/T) sensor may be installed between the feet and the ankle joint of the robot, and may be configured to detect whether each of the two feet make contact with the ground. The ground angle calculator may determine which of the two feet is supported on the ground according to sensor information detected from the F/T sensor, and may calculate the ground angle formed by the ground and the two feet based on the foot supported on the ground.

The ground angle formed by the ground and the two feet may be an angle that represents a degree of inclination of the two feet with respect to the ground in a roll direction and a pitch direction.

The ground may include a bump-type ground and a dip-type ground that are uneven.

During walking on the bump-type ground or the dip-type ground, the compensation value calculator may calculate compensation values of the hip joint, the knee joint and the ankle joint by use of the ground angle represented in the roll direction and the pitch direction.

The walking robot may further include a position trajectory generator. The position trajectory generator may be configured to generate, during walking of the robot, a position trajectory of the joint which is set according to the states of the plurality of legs. The target trajectory generator may generate the target trajectory of the joint by adding the calculated compensation value of the joint to the generated position trajectory of the joint.

The position trajectory generator may generate position trajectories of the hip joint, the knee joint and the ankle joint, which are provided at each of the plurality of legs, so as to perform a predetermined level walking.

During walking on the bump-type ground or the dip-type ground, the target trajectory generator may generate target trajectories of the hip joint, the knee joint and the ankle joint by use of the compensation values of the hip joint, the knee joint and the ankle joint.

In accordance with another aspect of the present disclosure, a method of controlling a walking of a robot provided with a plurality of legs and two feet provided at each of the plurality of legs, the method is as follows. During walking of the walking robot, a ground angle formed by a ground and the two feet may be calculated. A compensation value of a joint provided at each of the plurality of legs may be calculated by use of the calculated ground angle. A target trajectory of the joint may be generated by use of the calculated compensation value. A target torque of the joint that traces the generated target trajectory may be calculated. The walking of the walking robot may be controlled by transmitting the calculated target torque to the joint.

The ground angle formed by the ground and the two feet may be an angle that represents a degree of inclination of the two feet with respect to the ground.

The calculating of the ground angle may achieved by performing the following. Which of the two feet is supported on the ground may be determined, and an angle, which is formed by the ground and the two feet, may be calculated based on the foot supported on the ground in a roll direction and a pitch direction.

The ground may include a bump-type ground and a dip-type ground that are uneven.

The calculating of the compensation value of the joint is achieved by performing the following. During walking on the bump-type ground or the dip-type ground, compensation values of a hip joint, a knee joint and an ankle joint provided at each of the plurality of legs may be calculated by use of the ground angle represented in the roll direction and the pitch direction.

The method may be achieved by further performing the following. During walking on the bump-type ground or the dip-type ground, target trajectories of the hip joint, the knee joint and the ankle joint may be generated by use of the compensation values of the hip joint, the knee join and the ankle joint.

The target trajectories of the hip joint, the knee joint and the ankle joint may represent target trajectories that are calculated by adding the calculated compensation values of the hip joint, the knee joint and the ankle joint to position trajectories of the hip joint, the knee joint and the ankle joint that are set according to states of the plurality of legs.

The position trajectories of the hip joint, the knee joint and the ankle joint may represent position trajectories that are generated to perform a predetermined level walking.

As described above, rotation angles of the respective joints may not need to be precisely controlled during walking of the robot, and thus the walking may be achieved with a low servo gain and low energy consumption. In addition, since the respective joints each have a low stiffness, the impact as a result of collision with the surrounding environment may be reduced and thus the safety of walking may be enabled.

In addition, the robot may perform a knee-extended walking that is not achieved through the conventional walking method that requires the inverse kinematic calculation, so that a human-like walking may be achieved and thus the affinity of the robot with humans may be improved. In addition, the energy required to bend the knees of the robot may be saved. As a result of experiments, when compared to the conventional walking, the robot may have three times the walking speed with 20% of power consumption taken to operate the conventional robot.

In addition, a robot provided with the joints having six degrees of freedom may be applied with the present disclosure through a simple calculation of compensation angles without having to calculate complicated dynamic equations. A human-like walking of a robot with knees extended may be achieved according to a torque servo control other than a position servo control.

In addition, a stable walking on an uneven ground may be achieved through a simple calculation by use of the angle formed by the ground and each of the feet.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
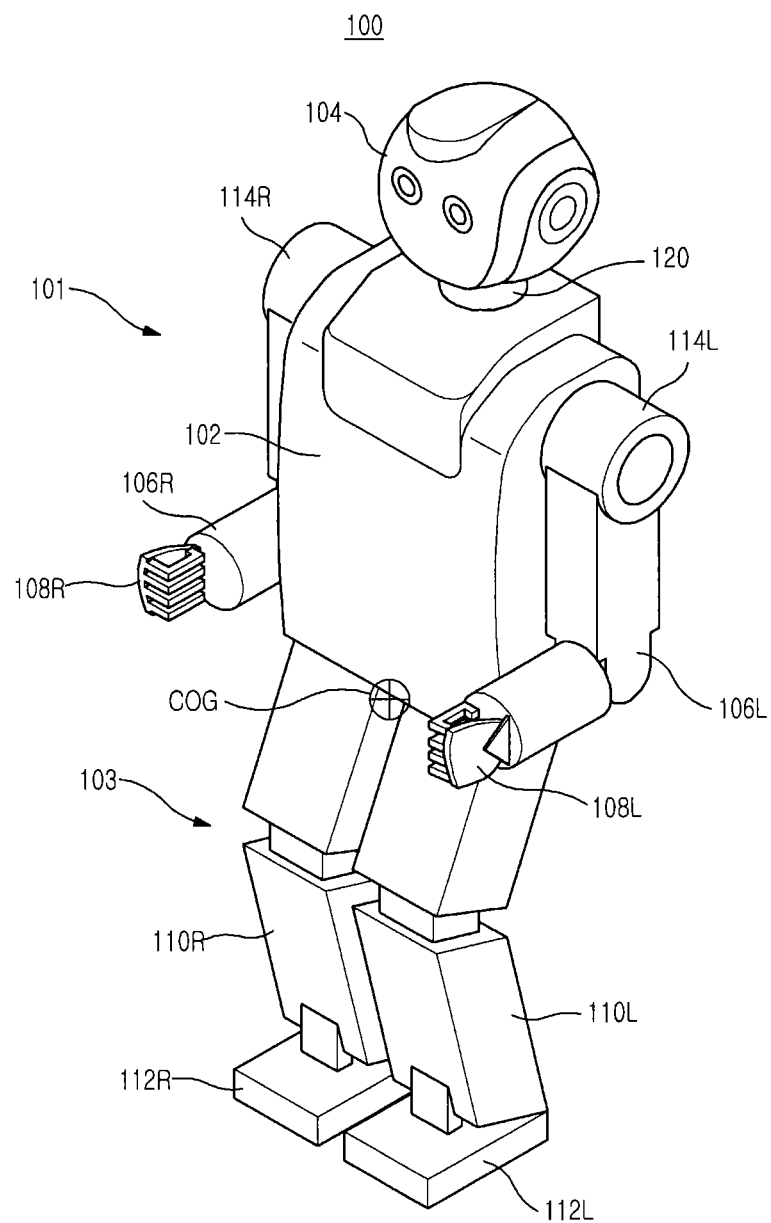
FIG. 1 is a view illustrating the external appearance of a robot in accordance with one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

FIG. 1 is a view illustrating the external appearance of a robot in accordance with one or more embodiments.

Referring to FIG. 1, a robot 100 in accordance with an embodiment of the present disclosure is a bipedal walking robot, which walks upright using two legs 110 in the same manner as a human, and may include an upper body 101 including a torso 102, a head 104, and arms 105, and a lower body 103 including the two legs 110.

The upper body 101 of the robot 100 may include the torso 102, the head 104 connected to the upper portion of the torso 102 through a neck 120, the two arms 106L and 106R connected to both sides of the upper portion of the torso 102 through shoulders 114L and 114R, and hands 108L and 108R respectively connected to tips of the two arms 106L and 106R.

The lower body 103 of the robot 100 may include the two legs 110L and 110R connected to both sides of the lower portion of the torso 102 of the upper body 101, and feet 112L and 112R respectively connected to tips of the two legs 110L and 110R. Here, "R" and "L" respectively indicate the right and left sides of the robot 100, and COG indicates the center of gravity of the robot 100.

Figure 2:
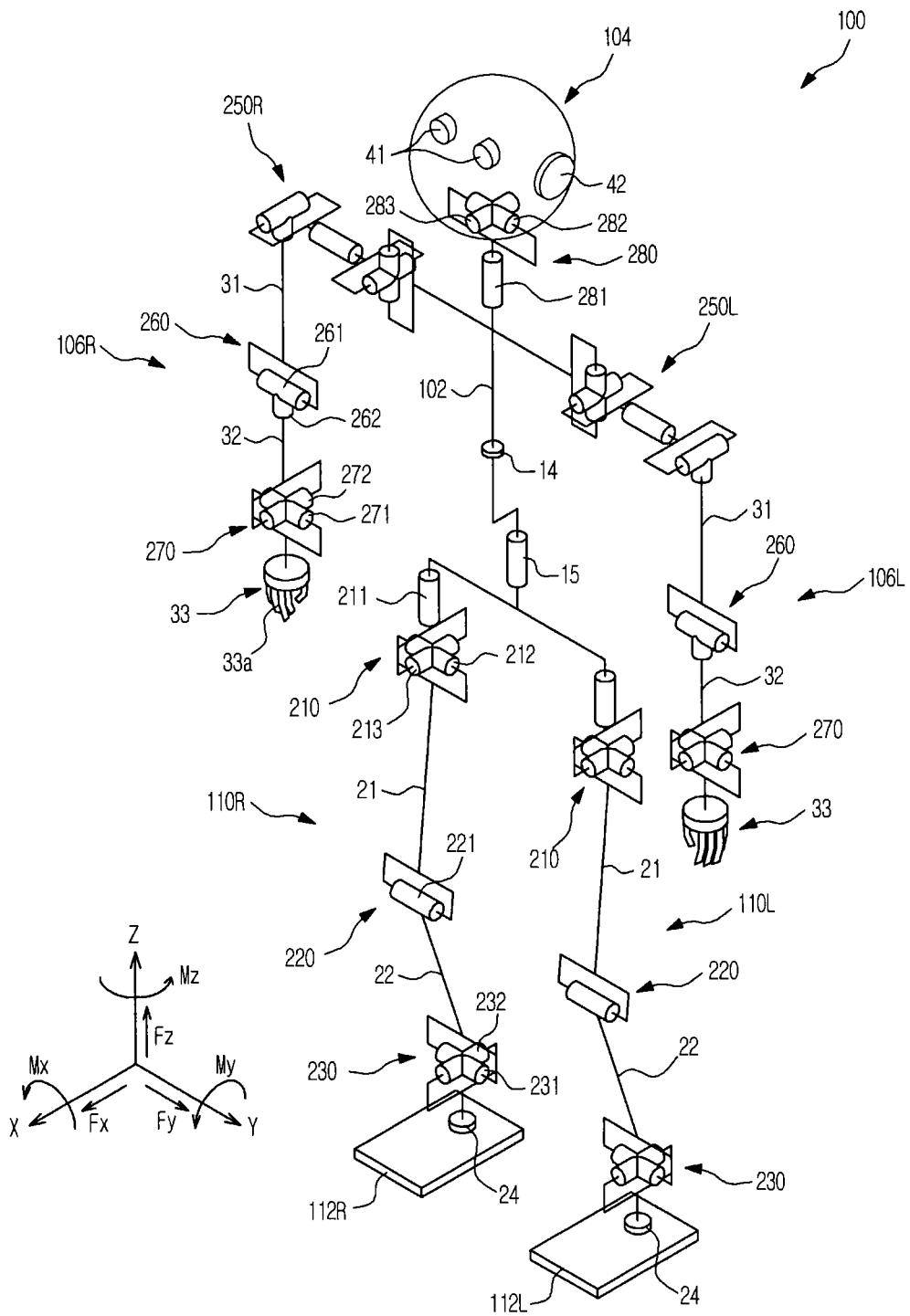
FIG. 2 is a view illustrating the mechanism of main joints of the robot shown on FIG. 1.

FIG. 2 is a view illustrating the mechanism of main joints of a robot shown on FIG. 1.

Referring to FIG. 2, a pose sensor 14 may be installed on the torso 102 of the robot 100. The pose sensor 14 may detect a tilt angle of the upper body 101, i.e., an inclination of the upper body 101 with respect to a vertical axis, and an angular velocity thereof, and then may generate pose data. The pose sensor 14 may be installed on the head 104 as well as the torso 102.

A waist joint 15 having one degree of freedom in the yaw direction so as to rotate the upper body 101 may be installed on the torso 102.

In addition, cameras 41 to capture surrounding images and microphones 42 to input user's voice may be installed on the head 104 of the robot 100.

The head 104 may be connected to the torso 102 of the upper body 101 through a neck joint 280. The neck joint 280 may include a rotary joint 281 in the yaw direction (rotated around the Z-axis), a rotary joint 282 in the pitch direction (rotated on the Y-axis), and a rotary joint 283 in the roll direction (rotated on the X-axis), and thus may have three degrees of freedom.

Motors (for example, actuators, such as electric motors or hydraulic motors) to rotate the head 104 may be connected to the respective rotary joints 281, 282, and 283 of the neck joint 280.

Each of the two arms 106L and 106R of the robot 100 may include an upper arm link 31, a lower arm link 32, and a hand 33.

The upper arm links 31 may be connected to the upper body 101 through shoulder joints 250L and 250R, the upper arm links 31 and the lower arm links 32 may be connected to each other through elbow joints 260, and the lower arm links 32 and the hands 33 may be connected to each other by wrist joints 270.

The shoulder joints 250L and 250R may be installed at both sides of the torso 102 of the upper body 101, and connect the two arms 106L and 106R to the torso 102 of the upper body 101.

Each elbow joint 260 may have a rotary joint 261 in the pitch direction and a rotary joint 262 in the yaw direction, and thus may have two degrees of freedom.

Each wrist joint 270 may have a rotary joint 271 in the pitch direction and a rotary joint 272 in the roll direction, and thus may have two degrees of freedom Each hand 33 may be provided with five fingers 33a. A plurality of joints (not shown) driven by motors may be installed on the respective fingers 33a. The fingers 33a may perform various motions, such as gripping of an article or pointing in a specific direction, in connection with movement of the arms 106.

The two legs 110L and 110R of the robot 100 respectively may include upper leg links 21, lower leg links 22, and the feet 112L and 112R.

The upper leg links 21 may correspond to thighs of a human and may be connected to the torso 102 of the upper body 101 through hip joints 210, the upper leg links 21 and the lower leg links 22 may be connected to each other by knee joints 220, and the lower leg links 22 and the feet 112L and 112R may be connected to each other by ankle joints 230

Each hip joint 210 may have a rotary joint (hip yaw joint) 211 in the yaw direction (rotated on the Z-axis), a rotary joint (hip pitch joint) 212 in the pitch direction (rotated on the Y-axis), and a rotary joint (hip roll joint) 213 in the roll direction (rotated on the X-axis), and thus may have three degrees of freedom.

Each knee joint 220 may have a rotary joint 221 in the pitch direction, and thus may have one degree of freedom.

Each ankle joint 230 may have a rotary joint 231 in the pitch direction and a rotary joint 232 in the roll direction, and thus may have two degrees of freedom.

Since six rotary joints of the hip joint 210, the knee joint 220, and the ankle joint 230 may be provided on each of the two legs 110L and 110R, a total of twelve rotary joints may be provided to the two legs 110L and 110R.

Meanwhile, multi-axis force and torque (F/T) sensors 24 may be respectively installed between the feet 112L and 112R and the ankle joints 230 of the two legs 110L and 110R. The multi-axis F/T sensors 24 may measure three-directional components Fx, Fy, and Fz of force and three-directional components Mx, My, and Mz of moment transmitted from the feet 112L and 112R, thereby possibly detecting whether or not the feet 112L and 112R land on the ground and load applied to the feet 112L and 112R.

Although not shown in the drawings, actuators, such as motors, to drive the respective rotary joints may be installed on the robot 100. A walk controller to control the overall operation of the robot 100 may control the motors, thereby possibly allowing the robot 100 to perform various actions.

Figure 3:
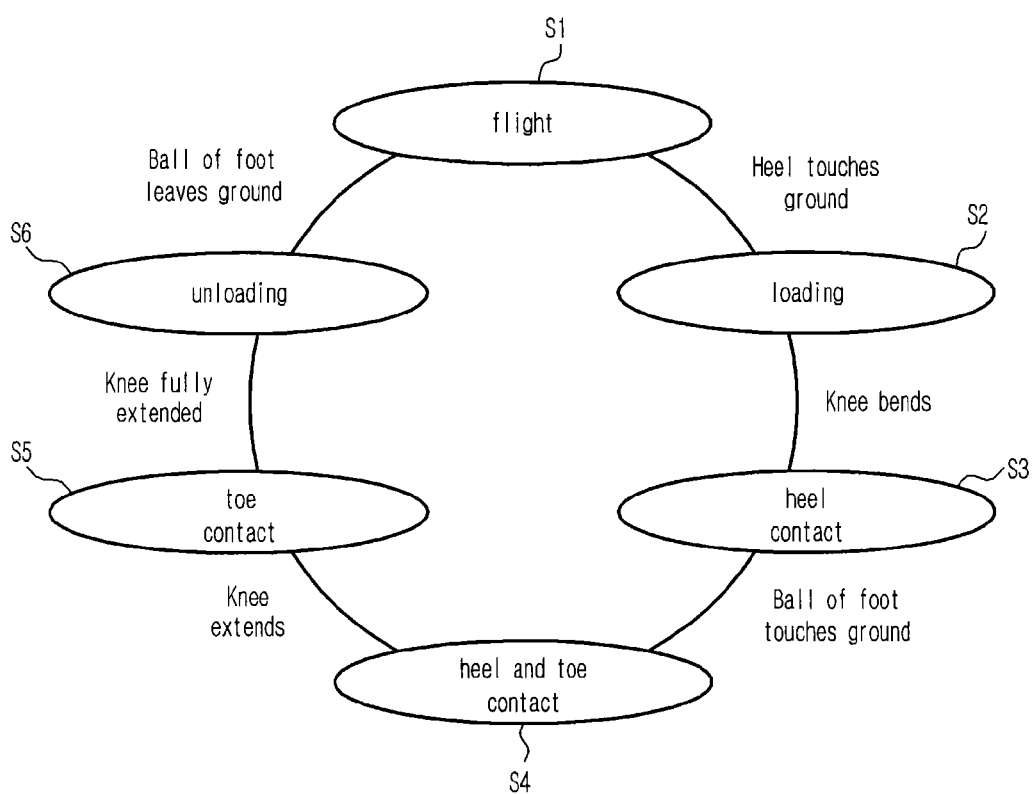
FIG. 3 is a view illustrating operating states of the robot and control actions of each operating state while a robot in accordance with one or more embodiments walks based on an FSM.

FIG. 3 is a view illustrating operating states of the robot and control actions of the respective operating states, while robot according to one or more embodiments walks based on an FSM.

With reference to FIG. 3, an FSM control method, operation of the robot 100 may be divided into a plurality of operating states (for example, 6 states—S1, S2, S3, S4, S5, and S6), which may be defined in advance. The respective operating states S1, S2, S3, S4, S5, and S6 may indicate poses of one leg 110L or 110R of the robot 100 during walking, and stable walking of the robot 100 may be achieved by proper transition between such poses of the robot 100.

The first operating state (flight state) S1 corresponds to a pose of swinging the leg 110L or 110R, the second operating state (loading state) S2 corresponds to a pose of landing the foot 112 on the ground, the third operating state (heel contact state) S3 corresponds to a pose of bringing the heel of the foot 112 into contact with the ground, the fourth operating state (heel and toe contact state) S4 corresponds to a pose of bringing both the heel and the toe of the foot 112 into contact with the ground, the fifth operating state (toe contact state) S5 corresponds to a pose of bringing the toe of the foot 112 into contact with the ground, and the sixth operating state (unloading state) S6 corresponds to a pose of taking the foot 112 from the ground.

In order to transition from one operating state to another operating state, a control action to transition a corresponding operation may be required.

In more detail, if the first operating state S1 transitions to the second operating state S2 (S1→S2), a control action in which the heel of the foot 112 touches the ground may be required.

If the second operating state S2 transitions to the third operating state S3 (S2→S3), a control action in which the knee (particularly, the knee joint) of the foot 112 touching the ground bends may be required.

If the third operating state S3 transitions to the fourth operating state S4 (S3→S4), a control action in which the toe of the foot 112 touches the ground may be required.

If the fourth operating state S4 transitions to the fifth operating state S5 (S4→S5), a control action in which the knee of the foot 112 touching the ground extends may be required.

If the fifth operating state S5 transitions to the sixth operating state S6 (S5→S6), a control action in which the knee of the foot 112 touching the ground fully extends may be required.

If the sixth operating state S6 transitions to the first operating state S1 (S6→S1), a control action in which the toe of the foot 112 leaves the ground may be required.

Therefore, in order to perform the control actions, the robot 100 may calculate torque commands of the respective joints, which may correspond to the respective control actions, and may output the calculated torque commands to the actuators, such as the motors, installed on the respective joints to drive the actuators.

In a FSM-based walking control method, the walking of the robot 100 may be controlled depending on the operating states S1, S2, S3, S4, S5, and S6, which may be defined in advance, and in a case of walking on an uneven ground, the transition between the operating states S1, S2, S3, S4, S5 and S6 for walking control may not maintain the balance of the robot 100.

Accordingly, a FSM-based walking control method in accordance with one or more embodiments may calculate the angle formed by each of the two feet 112 and the ground and may use the calculated angle to prevent the robot 100 from losing its balance when the robot 100 walks on an uneven ground.

In this case, the angle formed by each of the two feet 112 and the ground may be calculated depending on which of the feet 112L and 112R is at a stance state or a swing state based on sensor information detected through the F/T sensor 24 that may be installed between the feet 112L and 112R and the ankle joint 230.

Figure 4A:
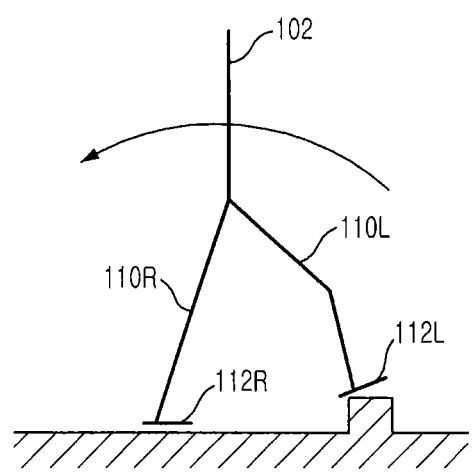
FIG. 4A is a view illustrating a bump-type ground during walking of a robot.
Figure 4B:
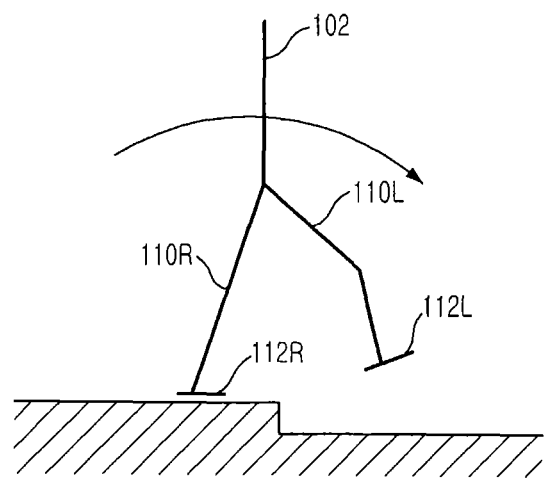
FIG. 4B is a view illustrating a dip-type ground during walking of a robot.

FIGS. 4A and 4B illustrate the ground on which the robot in accordance with one or more embodiments walks. FIG. 4A is a view illustrating a bump-type ground during walking of the robot. FIG. 4B is a view illustrating a dip-type ground during walking of the robot.

FIGS. 4A and 4B respectively illustrate states of a robot 100 walking on a bump-type ground and a dip-type ground. In each of the states, the torso 102 and the left and right legs 110L and 110R of the robot 110 are represented on an X-Y plane (two dimension space) with respect to the roll direction (the X-axis) and the pitch direction (the Y-axis) in a schematic form in the same manner that a human walks forward using two feet.

Referring to FIGS. 4A and 4B, examples of the uneven ground on which the robot 100 may walk include a bump-type ground and a dip-type ground.

The bump-type ground represents a case where one of the feet 112L and 112R at a swing state lands on a terrain or an article that is positioned higher than the remaining one of the feet 112L and 112R at a stance state.

The dip-type ground represents a case where one of the feet 112L and 112R at a swing state lands on a terrain or an article that is positioned lower than the remaining one of the feet 112L and 112R at a stance state.

Such a determination between the dip-type ground and the swing type ground may be made with respect to the walking direction (the roll direction, the X-direction) of the robot, and the dip-type ground and the swing type ground in the direction (the Y-axis) vertical to the walking direction may be also determined in the same manner. The bump-type ground and the dip-type ground are discussed herein in detail. However, all types of ground on which the robot 100 walks may be represented by a combination of the two types of grounds.

Accordingly, the FSM-based walking control method in accordance with one or more embodiments is described in relation to the robot 100 walking on the bump-type ground and the dip-type ground. Position trajectories for a predetermined level walking may be compensated by use of the angle formed by the two feet 112L and 112R and the ground so that stable walking of the robot 100 may be achieved while keeping the balance of the robot 100.

Figure 5:
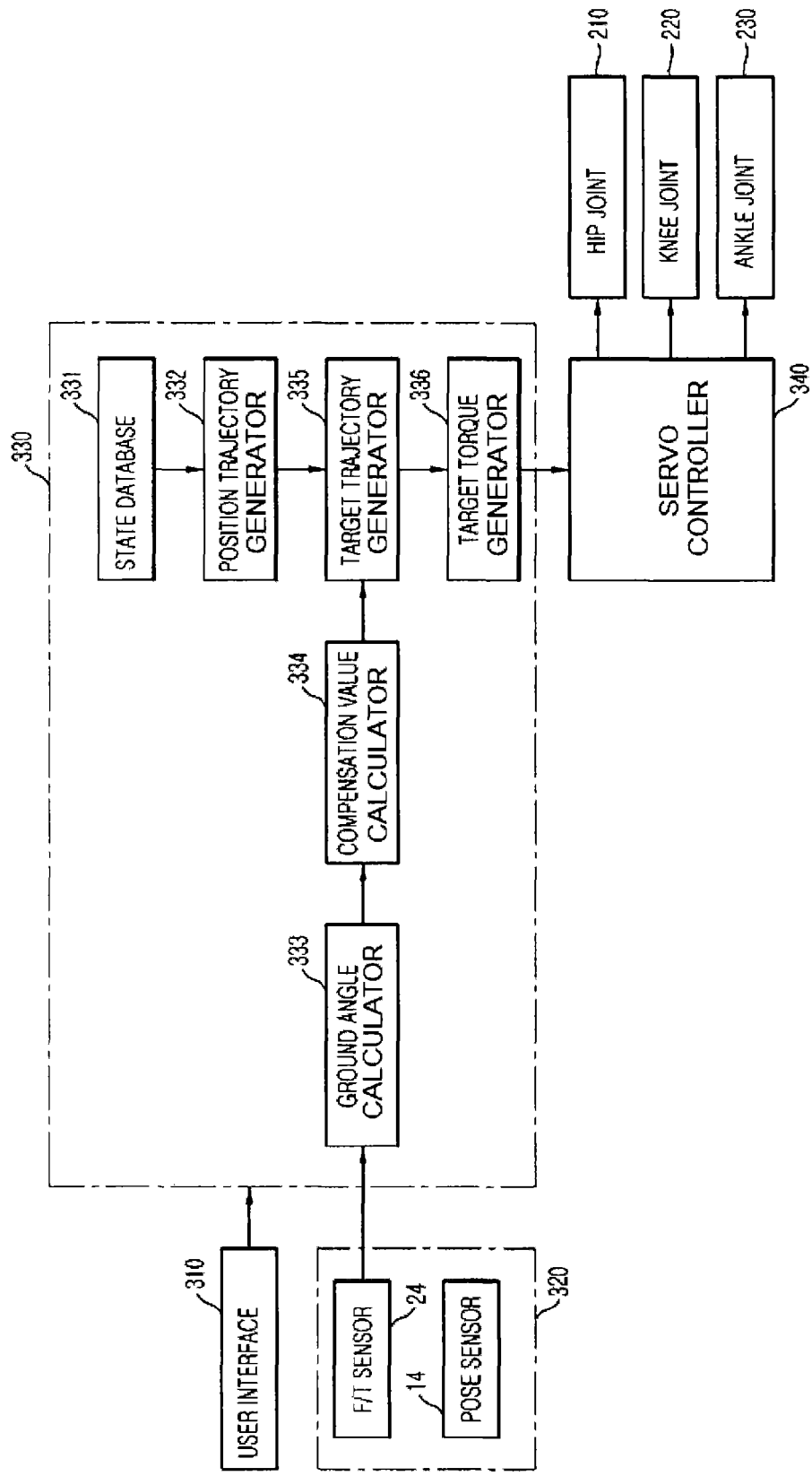
FIG. 5 is a block diagram illustrating the control of a robot walking in accordance with one or more embodiments.

FIG. 5 is a block diagram illustrating a walking control of a robot in accordance with one or more embodiments.

Referring to FIG. 5, the robot 100 in accordance with an embodiment of the present disclosure may include a user interface 310, a sensor 320, a walking controller 330, a servo controller 340, and the hip joint 210, the knee joint 220 and the ankle joint 230 of the two legs 110L and 110R.

The user interface 310 may input a user command to instruct a walking of the robot 100.

The sensor 320 may include the pose sensor 14 installed at the torso 102 of the robot 100 to detect the inclination or the posture of the upper body 101, and the F/T sensor 24 installed between the feet 112 and the ankle joint 230 of the robot 100 to detect a touch of the feet 112 with the ground.

The sensor to detect the posture of the upper body 101 may be implemented by a tilting detection sensor or a gyro sensor, in addition to the pose sensor. The sensor to detect the touch of the feet 112 on the ground may be implemented by a contact sensor or other sensors in addition to the F/T sensor 24.

The walking controller 330 may be a Proportional-Derivative (PD) controller configured to control the walking of the robot 100 based on the walking command being input through the user interface 310 and the senor information detected through the sensor 320, and may include a state database 331, a position trajectory generator 332, a ground angle calculator 333, a compensation value calculator 334, a target trajectory generator 335 and a target torque generator 336.

The state database 331, during walking of the robot 100, may store leg state data of the robot 100 based on the FSM, and operating state data of the respective joints including the hip joint 210, the knee joint 220 and the ankle joint 230 that correspond to the states of the legs of the robot 100.

The FSM may sequentially represent the change of the finite operating states of the legs 110L and 110R. The finite operating states of the legs 110L and 110R may be determined depending on whether a certain one of the feet 112L and 112R is at a stance state or a swing state.

The position trajectory generator 332 may generate the position trajectory to perform a predetermined level walking. The position trajectory generator 332 may generate target angles of the respective joints provided at the legs 110L and 110R, including the hip joint 210, the knee joint 220, and the ankle joint 230, according to the states of the legs of the robot 110 stored in the state database 331, and may generate a position trajectory (desired_Hip) of the hip joint 210 that connects the change of the target angle of the hip joint 210 with time, a position trajectory (desired_Knee) of the knee joint 220 that connects the change of the target angle of the knee joint 220 with time, and a position trajectory (desired_Ankle) of the ankle joint 230 that connects the change of the target angle of the ankle joint 230 with time.

The ground angle calculator 333 may calculate an angle (hereinafter, referred to as a ground angle) formed by the two feet 112L and 112R and the ground. The ground angle may be obtained based on a certain one of the feet 112L and the 112R that supports the ground.

In more detail, the ground angle calculator 333 may determine which one of the two feet 112L and 112R is placed on the ground, based on the sensor information detected from the F/T sensor 24 installed between the feet 112 and the ankle joint 230 of the robot 100. According to the result of the determination, the positions of the two feet 112L and 112R may be projected in the roll direction (the X-axis) and the pitch direction (the Y-axis) at each moment of the walking on the bump-type ground or the dip-type ground, and the angle formed by the feet 120 and the ground may be calculated with respect to the roll direction and the pitch direction. The ground angle in the roll direction and the pitch direction may be divided into a bump-type ground and a dip-type ground.

The compensation value calculator 334 may calculate compensation values of the respective joints of the legs 110L and 110R, that is, the hip joint 210, the knee joint 220, and the ankle joint 230, by use of the ground angle calculated by the ground angle calculator 333.

That is, the compensation value calculator 334 may calculate a compensation value (compensated_Hip) of the hip joint 210, a compensation value (compensated_Knee) of the knee joint 220, and a compensation value (compensated_Ankle) of the ankle joint 230 by use of the ground angle formed by the two feet 112L and 112R and the ground in the roll direction and the pitch direction.

For example, in the case of the bump-type ground, one of the feet 112L and 112R at a swing state lands on a terrain or an article that is positioned higher than the remaining one of the feet 112L and 112R at a stance, the joints of the one of the legs 110L and 11 OR at a swing state, including the hip joint, the knee joint and the ankle joint, may be bent to cancel a force of being pushed backward.

Meanwhile, in the case of the dip-type ground, one of the feet 112L and 112R at a swing state lands on a terrain or an article that is positioned lower than the remaining one of the feet 112L and 112R at a stance, the joints of the remaining one of the legs 110L and 11 OR at a stance state, including the hip joint, the knee joint and the ankle joint, may be bent to cancel a force of being pushed forward.

In more detail, in the case of the bump-type ground, one of the feet 112L and 112R at a swing state lands on a terrain or an article that is positioned higher than the remaining one of the feet 112L and 112R at a stance, compensation values of the hip joint 210, the knee joint 220 and the ankle joint 230 of the one of the legs 110L and 11 OR at a swing state may be calculated so as to cancel the force of pushing backward while bending the joints including the hip join, the knee joint and the ankle joint of the one of the legs 110L and 11 OR at a swing state.

Meanwhile, in the case of the dip-type ground, one of the feet 112L and 112R at a swing state lands on a terrain or an article that is positioned lower than the remaining one of the feet 112L and 112R at a stance, compensation values of the hip joint 210, the knee joint 220 and the ankle joint 230 of the remaining one of the legs 110L and 11 OR at a stance state may be calculated so as to cancel the force of pushing forward while bending the joints including the hip joint, the knee joint and the ankle joint of one of the legs 110L and 110R at a stance state. In addition, a compensation value of the hip joint 210 of the one of the legs 110L and 110R at a swing state may be calculated.

The target trajectory generator 336 is configured to generate target trajectories of the respective joints, which include the hip joint 210, the knee joint 220 and the ankle joint 230, provided at the legs 110L and 110R, by use of the compensation values of the respective joints of the legs 110L and 11 OR that are calculated from the compensation value calculator 334.

In more detail, the target trajectory generator 336 may obtain a target trajectory (new_desired_Hip) of the hip joint 210 by adding a compensation value (compensated_Hip) of the hip joint 210 to the position trajectory (desired_Hip) of the hip joint 210, a target trajectory (new_desired_Knee) of the knee joint 220 by adding a compensation value (compensated_Knee) of the knee joint 220 to the position trajectory (desired_Knee) of the knee joint 220, and a target trajectory (new_desired_Ankle) of the ankle joint 230 by adding a compensation value (compensated_Ankle) of the ankle joint 230 to the position trajectory (desired_Ankle) of the ankle joint 230.

The target torque calculator 336 may calculate target torques to trace the target trajectories of the respective joints 210, 220 and 230 that are generated from the target trajectory generator 335. The calculating of the target torques may be achieved at each control period.

The servo controller 340 may output a torque control signal corresponding to a target torque $T_i$, which may be calculated by the target torque calculator 336, to the hip joint 210, the knee joint 220 and the ankle joint 230 of one of the legs 110L and 11 OR such that the target torque $T_i$ is provided to the hip joint 210, the knee joint 220 and the ankle joint 230 to drive the actuators, such as motors, installed at the hip joint 210, the knee joint 220 and the ankle joint 230.

Accordingly, the hip joint 210, the knee joint 220 and the ankle joint 230 may receive the torque control signals from the servo controller 340, and may drive the actuators, such as motors, installed the hip joint 210, the knee joint 220 and the ankle joint 230, so that the robot 100 may achieve a stable walking while keeping its balance even on bump-type ground or dip-type ground.

Hereinafter, the operation processes and the effects of the walking robot in accordance with one or more embodiments configured as the above, and a control method thereof will be described.

The FSM based walking control method in accordance with one or more embodiments may operate a balance algorithm such that the robot 100 may perform a natural and stable walking even on a bump-type ground and a dip-type ground while keeping its balance.

The step difference (the height difference) of the ground or the article smaller than, for example, 5 cm corresponds to the height of a ground clearance that prevents the feet 112 from contacting the ground during a general level walking. In order to walk on the ground having a step difference having a height of, for example, 5 cm or above, a specific walking method such as in a staircase walking may need to be used.

Accordingly, in order to walk on the bump-type ground or the dip-type ground having a step difference having a height smaller than that of the ground clearance, in the balancing operation to keep the balance of the robot 100, the angle formed by the two feet 112 and the ground may need to be obtained in the roll direction and the pitch direction. Hereinafter, the obtaining of the ground angle for the balancing operation will be described with reference to FIGS. 6 and 7.

Figure 6:
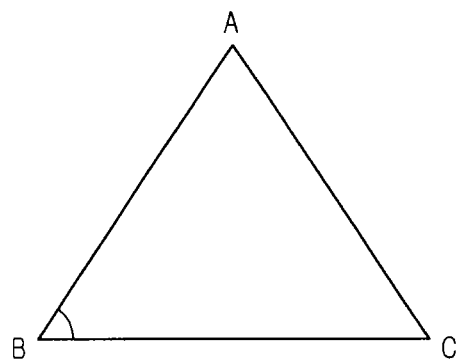
FIG. 6 is a view illustrated to explain the concept of an angle formed by the ground and two feet when a robot in accordance with one or more embodiments walks on a bump-type ground and a dip-type ground.

FIG. 6 is a view illustrated to explain the concept of an angle formed by the ground and two feet when a robot walks on a bump-type ground and a dip-type ground in accordance with one or more embodiments.

If assumed with respect to FIG. 6 that a certain one of the two feet 112L and 112R at a swing state is referred to as A, the remaining one of the two feet 112L and 112R at a stance state is referred to as B, and the ground on which the two feet 112L and 112R land is referred to as C, an angle (the ground angle) formed by the ground C and the two feet A and B is obtained as an included ∠angle ∠ B of the foot B that is supported on the ground C at a stance state.

Figure 7A:
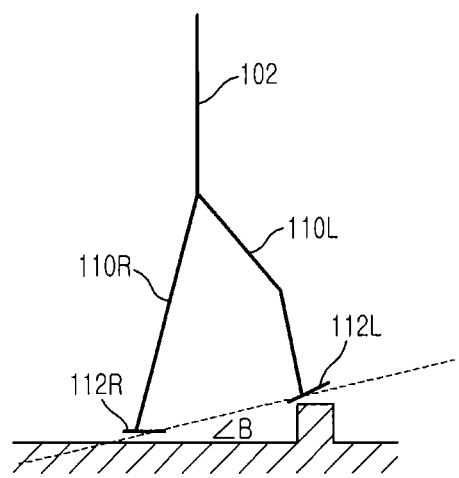
FIG. 7A is a view illustrating an angle formed by the ground and two feet when a robot in accordance with one or more embodiments walks on a bump-type ground.
Figure 7B:
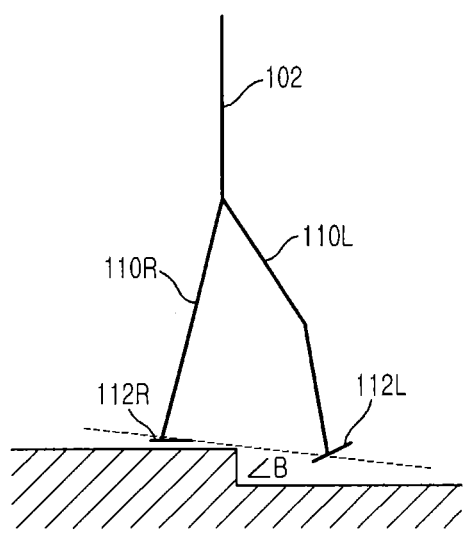
FIG. 7B is a view illustrating an angle formed by the ground and two feet when a robot in accordance with one or more embodiments walks on a dip-type ground.

FIGS. 7A and 7B are views illustrating the ground angles obtained as a robot in accordance with one or more embodiments walks. FIG. 7A is a view illustrating the ground angle obtained when a robot in accordance with one or more embodiments walks on a bump-type ground. FIG. 7B is a view illustrating the ground angle obtained when a robot in accordance with one or more embodiments walks on a dip-type ground.

Referring to FIGS. 7A and 7B, the ground angle formed by the ground C and the two feet A and B may be obtained as an included angle ∠B of the foot B supported on the ground C of a bump-type ground or a dip-type ground.

The ground angle, corresponding to an included angle of a certain one of the feet 112L and 112R supported on the ground, may be obtained as follows.

The included angle ∠B may be obtained through the second law of cosines as shown in the following mathematical formula 1.

$$\angle B = \cos^{-1}\left(\frac{\overline{BA}^2 + \overline{BC}^2 - \overline{AC}^2}{2 \times \overline{BA} \times \overline{BC}}\right)$$ [Mathematical Formula 1]

The positions of the two feet A and B may be projected in the roll direction and the pitch direction in the same manner as the above at each moment of the walking, and the angle $\angle B_{pitch \ and \ \angle Broll}$ formed by the feet and the ground may be obtained. The ground angle obtained in the pitch direction and the roll direction may be divided into two cases of a bump-type ground and a dip-type ground as shown in the following mathematical formula 2.

bump type ⟹ $FT_{SW} \geq FT_{threshold}$ (and)

Pos_Foot.$x_{SW} \geq$ Pos_Foot.$x_{ST}$ (and)

Pos_Foot.$z_{SW} \geq$ Pos_Foot.$z_{ST}$ (or ∠B>0)

dip type ⟹ $FT_{SW} \geq FT_{threshold}$ (and)

Pos_Foot.$x_{SW} \geq$ Pos_Foot.$x_{ST}$ (and)

Pos_Foot.$z_{SW} \leq$ Pos_Foot.$z_{ST}$ (or ∠B<0)   [Mathematical Formula 2]

In the mathematical formula 2, $FT_{SW}$ is an F/T sensor value of the foot A at a swing state, $FT_{THRESHOLD}$ is an F/T sensor threshold value that is set by a user, Pos_Foot$_x$ are positions of the feet A and B in the walking direction, Pos_Foot z are positions of the feet A and B in a direction perpendicular to the walking direction, and SW and ST represent the foot A at a swing state and the foot B at a stance state, respectively. $FT_{THRESHOLD}$ is a value that corresponds to a loading strength of the foot A required to operate the balancing algorithm, and may be set as an adjustable value according to experimental results.

Meanwhile, when the condition of the mathematical formula 2 is satisfied, the balance algorithm may be applied to a position trajectory (a desired trajectory) for a predetermined level walking. To this end, as shown the following mathematical formula equation 3, the compensation values of the respective joint, which may include the hip joint, the knee joint and the ankle joint, provided the legs 110L and 110R are obtained by use of the angle ($\angle B_{pitch}$ and $\angle B_{roll}$) at which the balance action operates.

bump type ⟹ compenstated_Hip_SW=$-(\angle B_{pitch}/2+\angle B_{roll}/2)$ compenstated_Knee_SW=$(\angle B_{pitch}/2+\angle B_{roll}/2)$ compenstated_Ankle_SW=$-(\angle B_{pitch}+\angle B_{roll})$ dip type ⟹ compenstated_Hip_SW=$-(\angle B_{pitch}+\angle B_{roll})$ compenstated_Hip_ST=$(\angle B_{pitch}+\angle B_{roll}/2)$ compenstated_Knee_ST=$(\angle B_{pitch}/2+\angle B_{roll}/2)$ compenstated_Ankle_ST=$(\angle B_{pitch}+\angle B_{roll}$[Mathematical Formula 3]

The compensation value obtained through the mathematical formula 3 may be added to a position trajectory (the desired trajectory) for a predetermined level walking, thereby calculating a final target trajectory (a new desired trajectory) as shown in the following mathematical formula 4.

new_desired_Hip($\theta_{d.Hip}$)=desired_Hip+compensated_Hip new_desired_Knee($\theta_{d.Knee}$)=desired_Knee+compensated_Knee new_desired_Ankle($\theta_{d.Ankle}$)=desired_Ankle+compensated_Ankle  [Mathematical Formula 4]

In the mathematical formula 4, desired_Hip represents a position trajectory of the hip joint 210 for a level walking, desired_Knee represents a position trajectory of the knee joint 220 for a level walking and desired_Ankle represents a position trajectory of the ankle joint 230 for a level walking.

In this manner, as for the bump-type ground, if the foot A at a swing state lands on a terrain or an article positioned higher than the foot B at a stance state, the joints of a certain one of the legs 110L and 110R at a swing state, including the hip joint, the knee joint and the ankle joint may be bent to cancel the force of being pushed backward.

Meanwhile, as for the dip-type ground, if the foot A at a swing state lands on a terrain or an article positioned lower than the foot B at a stance state, the joints of a certain one of the legs 110L and 110R at a stance state, including the hip joint, the knee joint and the ankle joint may be bent to cancel the force of being pushed forward.

Accordingly, torques using target angles and angular velocities of the respective joints may be calculated by a Proportional-Derivative (PD) controller control method through the following mathematical formula 5.

$\tau_i = k_{p,i} \cdot (\theta_d - \theta_c) + k_{d,i} \cdot (\dot{\theta}_d - \dot{\theta}_c)$  [Mathematical Formula 5]

In the mathematical formula 5, $\tau$ is a torque value at each control period, $\theta_d$ is a target angle at each control period, $\dot{\theta}_d$ is a targe angluar velocity at each control period, $\theta_c$ is a current angle at each control period, $\dot{\theta}_c$ is a current angluar velocity at each control period, and $k_p$ and $k_d$ are coefficients. The coefficients may be determined so as to be adjusted through repetitive experiments to ensure a stable walking. i represents the respective joint, and the torque of the respective joint may be obtained through the above. An angular velocity $\dot{\theta}$ may be obtained by differentiating an angle $\theta$.

As described above, in accordance with an embodiment of the present disclosure, the balance algorithm may be applied to the position trajectory of level walking, which is determined in advance, by use of the angle formed between the ground and the two feet. Walking on the uneven ground C, which serves as a disturbance, is possible. Motions obtained according to the above may be similar to the motions of a human.

Figure 8:
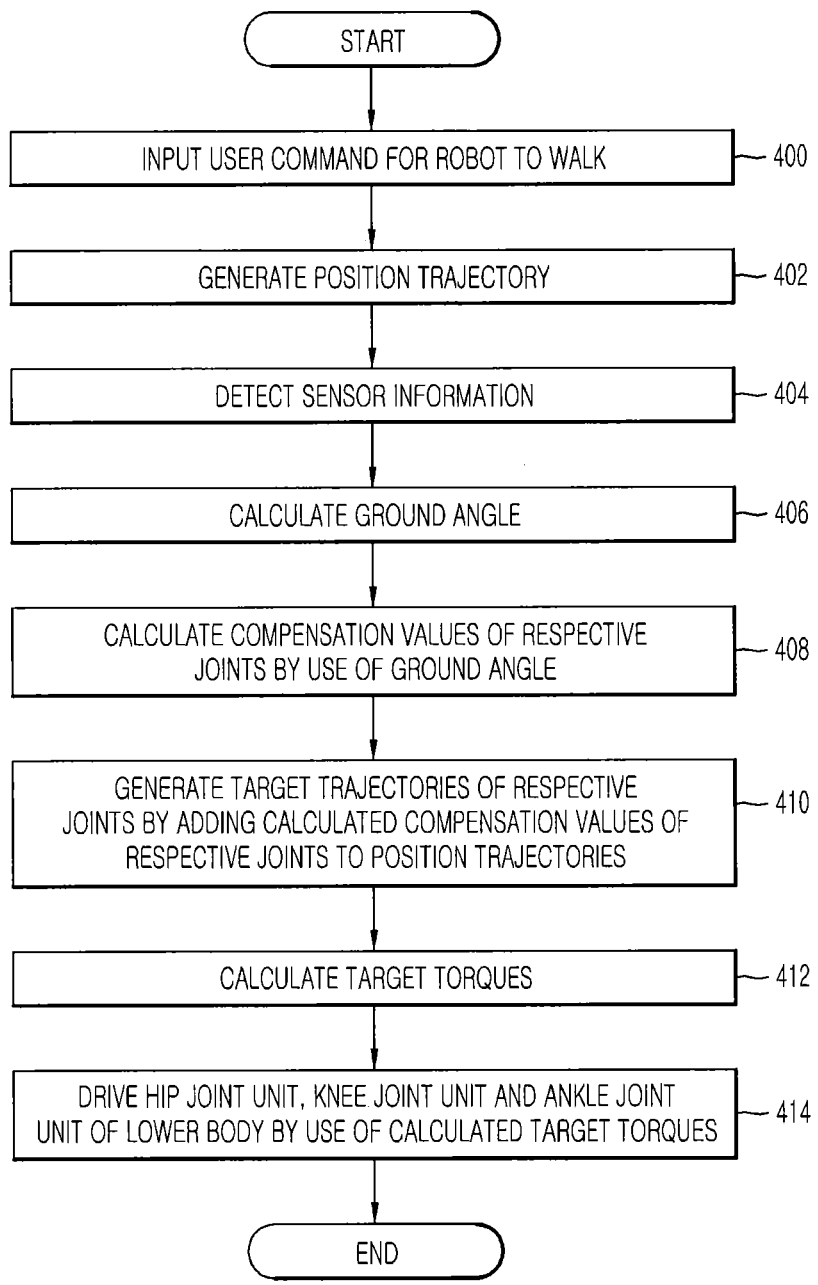
FIG. 8 is a flow chart illustrating a method of controlling a walking of a robot in accordance with one or more embodiments.

FIG. 8 is a flow chart illustrating a method of controlling a walking of a robot in accordance with one or more embodiments.

Referring to FIG. 8, a user command to instruct the walking of the robot 100 may be input through the user interface 310 (400).

If the user command is input, the position trajectory generator 332 may generate target angles of the respective joints provided at the legs 110L and 110R, that is, the hip joint 210, the knee joint 220 and the ankle joint 230, according to the state of the legs of the robot 100 that is stored in the state database 331, and may generate a position trajectory (desired_Hip) of the hip joint 210 that connects the change of the target angle of the hip joint 210 with time, a position trajectory (desired_Knee) of the knee joint 220 that connects the change of the target angle of the knee joint 220 with time, and a position trajectory (desired_Ankle) of the ankle joint 230 that connects the change of the target angle of the ankle joint 230 with time (402). Each of the position trajectory (desired_Hip) of the hip joint 210, the position trajectory (desired_Knee) of the knee joint 220, and position trajectory (desired_Ankle) of the ankle joint 230 may represent a position trajectory for a predetermined level walking.

Thereafter, the pose sensor 14 installed at the torso 12 of the robot 100 may detect the inclination or the posture of the upper body 101, and the F/T sensor 24 installed on the feet 112 of the robot 100 may detect the contact of the feet 112 with the ground, so that the sensed information is transmitted to the ground angle calculator 333 of the walking controller 330 (404).

Accordingly, the ground angle calculator 333 may calculate the ground angle formed by the ground and the two feet 112L and 112R (406).

With respect to calculating the ground angle formed by the ground and the feet 112L and 112R, during walking on the bump-type ground or the dip-type ground, the positions of the two feet 112L and 112R may be projected in the roll direction (the X-axis) and the pitch direction (the Y-axis) at each moment of the walking, and the ground angle formed by the ground and the two feet 112L and 112R may be calculated in the roll direction and the pitch direction. The ground angle calculated in the roll direction and the pitch direction may be transmitted to the compensation value calculator 334 while being divided in the two cases of a bump-type ground and a dip-type ground as shown through the mathematical formula 2.

bump type⇒ $FT_{SW} \geq FT_{threshold}$ (and)

Pos_Foot.$x_{SW} \geq$ Pos_Foot.$x_{ST}$ (and)

Pos_Foot.$z_{SW} \geq$ Pos_Foot.$z_{ST}$ (or ∠B>0)

dip type⇒ $FT_{SW} \geq FT_{threshold}$ (and)

Pos_Foot.$x_{SW} \geq$ Pos_Foot.$x_{ST}$ (and)

Pos_Foot.$z_{SW} \leq$ Pos_Foot.$z_{ST}$ (or ∠B<0)  [Mathematical Formula 2]

Accordingly, as shown on the mathematical formula 3, the compensation value calculator 334 may calculate compensation values of the respective joints of the legs 110L and 110R, that is, the hip joint 210, the knee joint 220 and the ankle joint 230, by use of the calculated ground angle, and may transmit the calculated compensation values to the target trajectory generator 335 (408).

bump type⇒ compenstated_Hip__SW=$-(\angle B_{pitch}/2 + \angle B_{roll}/2)$ compenstated_Knee__SW=$(\angle B_{pitch}/2 + \angle B_{roll}/2)$ compenstated_Ankle__SW=$-(\angle B_{pitch} + \angle B_{roll})$ dip type⇒ compenstated_Hip__SW=$-(\angle B_{pitch} + \angle B_{roll})$ compenstated_Hip__ST=$(\angle B_{pitch} + \angle B_{roll}/2)$ compenstated_Knee__ST=$(\angle B_{pitch}/2 + \angle B_{roll}/2)$ compenstated_Ankle__ST=$(\angle B_{pitch} + \angle B_{roll})$  [Mathematical Formula 3]

The compensation values calculated through the mathematical formula 3 may include a compensation value (compensated_Hip) of the hip joint 210, a compensation value (compensated_Knee) of the knee joint 220, and a compensation value (compensated_Ankle) of the ankle joint 230.

Thereafter, the target trajectory generator 335 may generate target trajectories of the respective joints provided at the legs 110L and 110R, that is, the hip joint 210, the knee joint 220, and the ankle joint 230 through the following mathematical formula 4, by use of a compensation value (compensated_Hip) of the hip joint 210, a compensation value (compensated_Knee) of the knee joint 220, and a compensation value (compensated_Ankle) of the ankle joint 230 that may be calculated by the compensation value calculator 334, and may transmit the calculated target trajectories of the respective joints to the target torque calculator 336 (410).

$$\text{new\_desired\_Hip}(\theta_{d.Hip}) = \text{desired\_Hip} + \text{compensated\_Hip}$$

$$\text{new\_desired\_Knee}(\theta_{d.Knee}) = \text{desired\_Knee} + \text{compensated\_Knee}$$

$$\text{new\_desired\_Ankle}(\theta_{d.Ankle}) = \text{desired\_Ankle} + \text{compensated\_Ankle} \quad \text{[Mathematical Formula 4]}$$

In the mathematical formula 4, a target trajectory (new_desired_Hip) of the hip joint 210 may be obtained by adding a compensation value (compensated_Hip) of the hip joint 210 to the position trajectory (desired_Hip) of the hip joint 210, a target trajectory (new_desired_Knee) of the knee joint 220 may be obtained by adding a compensation value (compensated_Knee) of the knee joint 220 to the position trajectory (desired_Knee) of the knee joint 220, and a target trajectory (new_desired_Ankle) of the ankle joint 230 may be obtained by adding a compensation value (compensated_Ankle) of the ankle joint 230 to the position trajectory (desired_Ankle) of the ankle joint 230.

Accordingly, the target torque calculator 336 may calculate target torques configured to trace the target trajectories of the respective joints 210, 220 and 230 generated by the target trajectory generator 335, by use of the target angles and the angular velocities of the respective joints 210, 220 an 230 (412). The calculating of the target torque may be performed at each control period.

Thereafter, the servo controller 340 may transmit the target torque $T_i$, which may be calculated by the target torque calculator 336, to the hip joint 210, the knee joint 220, and the ankle joint 230 of a certain one of the legs 110L and 110R to drive actuators, such as motors, installed at the hip joint 210, the knee joint 220, and the ankle joint 230 (414), thereby possibly achieving a stable walking while keeping the balance of the robot 100 even on the bump-type ground and the dip-type ground.

Accordingly, the robot 100 may keep the balance even if the ground is uneven and without depending on the moving speed of the robot 100.

In addition, since the robot 100 may keep the balance by use of the respective joints of the two feet 110L and 110R that support the torso 102 even when the ground is tilt, the balancing method may be achieved in a simple manner and thus may be applied to the robot 100 provided with the joints having six degrees of freedom.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A walking robot provided with a plurality of legs and feet provided at each of the plurality of legs, respectively, the walking robot comprising:

a plurality of joints provided at each of the plurality of legs;
a position trajectory generator configured to generate a position trajectory of each joint which is set based on states of a Finite State Machine (FSM) control method of the plurality of legs;
a ground angle calculator configured to calculate a ground angle formed by a ground and the feet;
a compensation value calculator configured to calculate a compensation value of the each joint by use of the calculated ground angle;
a target trajectory generator configured to generate a target trajectory of the each joint by use of the calculated compensation value of the each joint and the generated position trajectory of the each joint;
a target torque calculator configured to calculate a target torque of the each joint so as to trace the generated target trajectory; and
a servo controller configured to control a walking of the walking robot by transmitting the calculated target torque to the each joint.

2. The walking robot of claim 1, wherein the plurality of joints comprises a hip joint, a knee joint and an ankle joint provided at each of the plurality of legs.

3. The walking robot of claim 2, further comprising:
a force/torque (F/T) sensor installed between the foot and the ankle joint of each of the plurality of legs, respectively, and configured to detect whether the foot makes contact with the ground,
wherein the ground angle calculator determines which of the plurality of feet is supported on the ground according to sensor information detected from the F/T sensor, and calculates the ground angle formed by the ground and the foot supported on the ground.

4. The walking robot of claim 3, wherein the ground angle formed by the ground and the foot supported on the ground is an angle that represents a degree of inclination of the foot supported on the ground with respect to the ground in a roll direction and a pitch direction.

5. The walking robot of claim 4, wherein the ground comprises a bump-type ground and a dip-type ground that are uneven.

6. The walking robot of claim 5, wherein during walking on the bump-type ground or the dip-type ground, the compensation value calculator calculates compensation values of the hip joint, the knee joint and the ankle joint by use of the ground angle represented in the roll direction and the pitch direction.

7. The walking robot of claim 6,
wherein the target trajectory generator generates the target trajectory of the each joint by adding the calculated compensation value of the each joint to the generated position trajectory of the each joint.

8. The walking robot of claim 7, wherein the position trajectory generator generates position trajectories of the hip joint, the knee joint and the ankle joint, which are provided at each of the plurality of legs, so as to perform a predetermined level walking.

9. The walking robot of claim 7, wherein during walking on the bump-type ground or the dip-type ground, the target trajectory generator generates target trajectories of the hip joint, the knee joint and the ankle joint by use of the compensation values of the hip joint, the knee joint and the ankle joint.

10. A method of controlling a walking robot provided with a plurality of legs and feet provided at each of the plurality of legs, respectively, the method comprising:
by one or more processing devices:
generating a position trajectory of each joint which is set based on states of a Finite State Machine (FSM) control method of the plurality of legs;
calculating a ground angle formed by a ground and the feet based on sensor information detected from a sensor of the walking robot, during walking;
calculating a compensation value of a joint provided at each of the plurality of legs by use of the calculated ground angle;
generating a target trajectory of the joint by use of the calculated compensation value;
calculating a target torque of the joint that traces the generated target trajectory; and
controlling the walking of the walking robot by transmitting the calculated target torque to the joint.

11. The method of claim 10, wherein the ground angle formed by the ground and the feet is an angle that represents a degree of inclination of the feet with respect to the ground.

12. The method of claim 11, wherein the calculating of the ground angle comprises:
determining which of the feet is supported on the ground, and calculating an angle, which is formed by the ground and the foot supported on the ground in a roll direction and a pitch direction.

13. The method of claim 12, wherein the ground comprises a bump-type ground and a dip-type ground that are uneven.

14. The method of claim 13, wherein the calculating of the compensation value of the joint comprises:
calculating, during walking on the bump-type ground or the dip-type ground, compensation values of a hip joint, a knee joint and an ankle joint provided at each of the plurality of legs by use of the ground angle represented in the roll direction and the pitch direction.

15. The method of clam 14, further comprising:
generating, during walking on the bump-type ground or the dip-type ground, target trajectories of the hip joint, the knee joint and the ankle joint by use of the compensation values of the hip joint, the knee joint and the ankle joint.

16. The method of claim 15, wherein the target trajectories of the hip joint, the knee joint and the ankle joint represent target trajectories that are calculated by adding the calculated compensation values of the hip joint, the knee joint and the ankle joint to the position trajectories of the hip joint, the knee joint and the ankle joint that are set according to the states of the FSM control method of the plurality of legs.

17. The method of claim 16, wherein the position trajectories of the hip joint, the knee joint and the ankle joint represent position trajectories that are generated to perform a predetermined level walking.

18. A method of controlling a walking robot provided with a plurality of legs and feet provided at each of the plurality of legs, respectively, the method comprising:
by one or more processing devices:
generating a position trajectory of each joint which is set based on states of a Finite State Machine (FSM) control method of the plurality of legs;
calculating a ground angle formed by a ground and the feet based on sensor information detected from a sensor of the walking robot, during walking;
calculating a compensation value of each joint provided at each of the plurality of legs by use of the calculated ground angle;
generating a target trajectory of the each joint by adding the calculated compensation value of the each joint to a position trajectory of the each joint; and calculating a target torque of the each joint that traces the generated target trajectory.

19. The method of claim 18, wherein the calculating of the ground angle comprises:
determining which of the feet is supported on the ground, and calculating an angle, which is formed by the ground and the foot supported on the ground in a roll direction and a pitch direction.

20. The method of claim 19, wherein the ground comprises a bump-type ground and a dip-type ground that are uneven.

* * * * *